United States Patent
Gehring et al.

(10) Patent No.: US 12,173,852 B2
(45) Date of Patent: Dec. 24, 2024

(54) METHOD FOR PREPARING TO REFUEL A VEHICLE

(71) Applicant: CELLCENTRIC GMBH & CO. KG, Kirchheim unter Teck (DE)

(72) Inventors: Ottmar Gehring, Magstadt (DE); Christian Ballarin, Stuttgart (DE); Steffen Maus, Reutlingen (DE); Jens Franzen, Stuttgart (DE)

(73) Assignee: CELLCENTRIC GMBH & CO. KG, Kirchheim unter Teck (DE)

( * ) Notice: Subject to any disclaimer, the term of this patent is extended or adjusted under 35 U.S.C. 154(b) by 47 days.

(21) Appl. No.: 18/005,120

(22) PCT Filed: Jul. 5, 2021

(86) PCT No.: PCT/EP2021/068468
§ 371 (c)(1),
(2) Date: Jan. 11, 2023

(87) PCT Pub. No.: WO2022/012986
PCT Pub. Date: Jan. 20, 2022

(65) Prior Publication Data
US 2023/0258300 A1  Aug. 17, 2023

(30) Foreign Application Priority Data
Jul. 13, 2020 (DE) ............... 10 2020 004 202.3

(51) Int. Cl.
*F17C 5/00* (2006.01)
*F17C 5/02* (2006.01)

(52) U.S. Cl.
CPC ............ *F17C 5/007* (2013.01); *F17C 5/02* (2013.01); *F17C 2221/012* (2013.01); *F17C 2223/0161* (2013.01); *F17C 2265/065* (2013.01)

(58) Field of Classification Search
CPC .............. G05D 1/101; F17C 2265/065; F17C 2223/0161; F17C 2221/012; F17C 5/02; F17C 5/007
See application file for complete search history.

(56) References Cited

U.S. PATENT DOCUMENTS 7,352,561 B2   4/2008  Nakamura

FOREIGN PATENT DOCUMENTS

| DE | 10021681 A1 | * 11/2001 | ............... F17C 5/02 |
| DE | 10241688 | 5/2003 | |

(Continued)

OTHER PUBLICATIONS

Pehr et al., "Liquid hydrogen for motor vehicles—The world's first public LH2 filling station," International Journal of Hydrogen Energy, vol. 26, No. 7, Jul. 2001, pp. 777-782.

(Continued)

*Primary Examiner* — Timothy L Maust
(74) *Attorney, Agent, or Firm* — Sheridan Ross P.C.

(57) ABSTRACT

The invention relates to a method for preparing to refuel a tank in a vehicle with hydrogen, for which purpose the tank pressure is lowered in preparation for driving to a filling station, wherein the filling station is informed of the pending refueling. The method according to the invention is characterized in that the refueling takes place with liquid hydrogen, wherein the maximum achievable pressure level of the tank during refueling, the expected pressure level of the tank when the filling station is reached, and the expected refueling quantity are transmitted to the filling station.

19 Claims, 1 Drawing Sheet

(56) References Cited

FOREIGN PATENT DOCUMENTS

| | | |
|---|---|---|
| DE | 102012018515 | 3/2014 |
| DE | 102017006158 | 1/2019 |
| JP | 2002-373230 | 12/2002 |
| JP | 4153690 | 9/2008 |
| JP | 5740468 | 6/2015 |
| JP | 5839546 | 1/2016 |

OTHER PUBLICATIONS

International Search Report and Written Opinion for International (PCT) Patent Application No. PCT/EP2021/068468, dated Oct. 26, 2021, 11 pages.

International Preliminary Report on Patentability for International Patent Application No. PCT/EP2021/068468, dated Oct. 26, 2021, 7 pages.

* cited by examiner

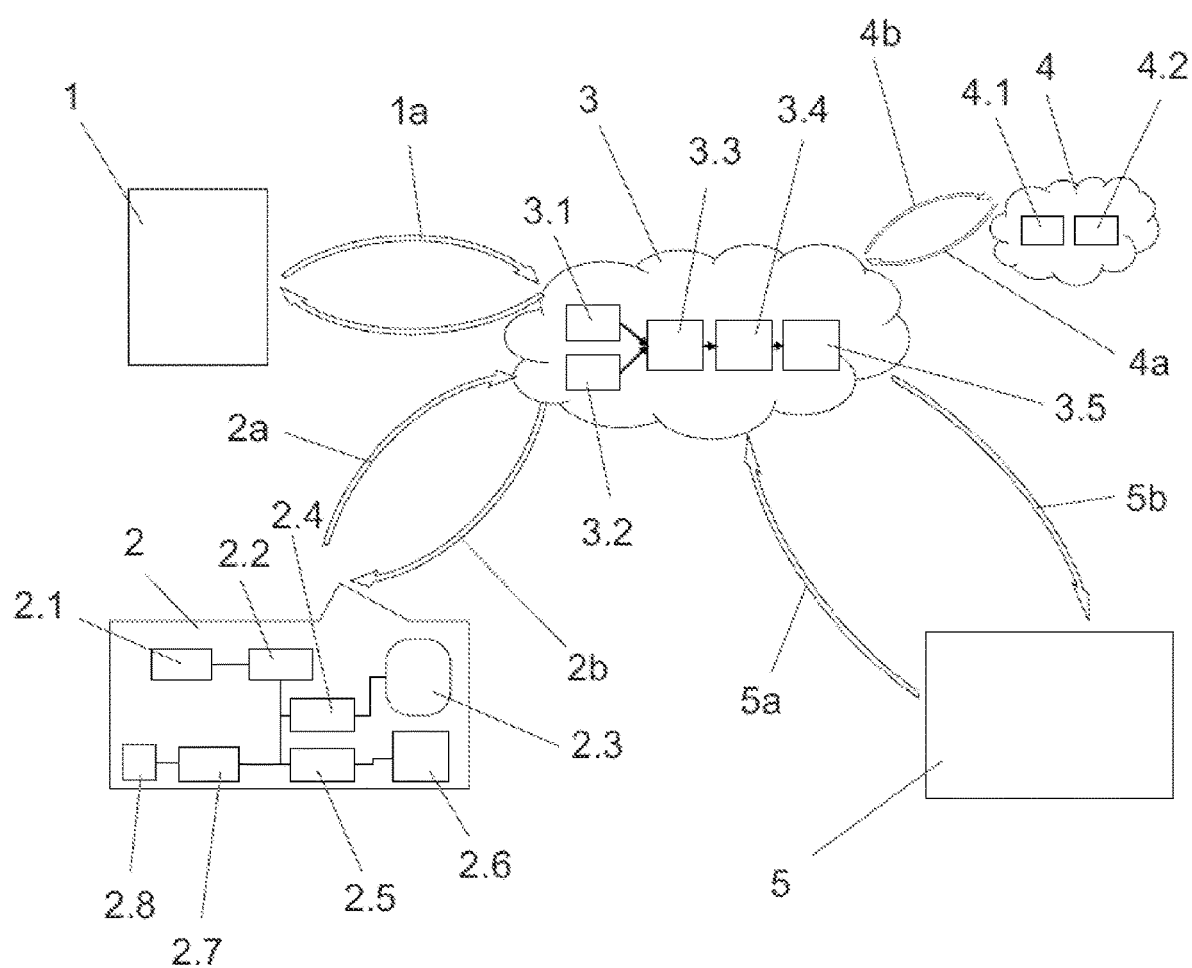

METHOD FOR PREPARING TO REFUEL A VEHICLE

CROSS REFERENCE TO RELATED APPLICATIONS

This application is a national stage application under 35 U.S.C. 371 and claims the benefit of PCT Application No. PCT/EP2021/068468 having an international filing date of 5 Jul. 2021, which designated the United States, and which PCT application claimed the benefit of German Patent Application No. 10 2020 004 202.3 filed 13 Jul. 2020, the contents of each of which are incorporated herein by reference in their entireties.

TECHNICAL FIELD

The invention relates to a method for preparing to refuel a tank in a vehicle with hydrogen, according to the type defined in more detail in the preamble of claim 1.

BACKGROUND

Refueling with hydrogen is relatively complex compared to refueling with gasoline, diesel, or the like. This applies in particular when the hydrogen is not stored in the gaseous phase as compressed hydrogen and/or is stored in the vehicle, but when the vehicle's tank is a so-called cryotank, which stores the hydrogen in liquid form at a correspondingly low temperature. In this case, it is critical when the tank pressure rises above a predetermined maximum pressure, whether that is during operation or in particular during refueling, since hydrogen then has to be released in order to maintain the permissible maximum pressure. This so-called boil-off is a serious disadvantage that should be avoided.

It is known in principle from the general prior art to use suitable strategies when refueling vehicles with hydrogen in order to be able to refuel with as much hydrogen as possible, for example. For this purpose, hydrogen can be used deliberately and increasingly when a filling station is approached, instead of other energy sources that may be present in the vehicle, to provide energy, whether that be drive energy or energy for climate control or the like. In this context, reference can be made to DE 10 2017 006 158 A1 from the applicant. Appropriate strategies are described therein for managing a pre-planned route as efficiently as possible with minimal refueling times.

DE 10 2012 018 515 A1 discloses the refueling of a fuel cell vehicle from a mobile refueling device, for which purpose there is corresponding communication between the provider of the mobile refueling device and the vehicle itself about a possible location for refueling. The communication between a vehicle to be refueled and a stationary filling station is also the subject of JP 4153690 and JP 5839546, related there to gaseous hydrogen. On the basis of predefined data from the vehicle or its tank, which are transmitted to the filling station, the refueling can also be optimized to the effect that the most accurate possible temperature at the end of the refueling process is calculated in advance, which is described in JP 5740468 accordingly. With regard to the further prior art, reference can also be made to U.S. Pat. No. 7,325,561, which very generally describes an optimization of refueling with hydrogen, in which more hydrogen is consumed when the filling station is approached, as a result of which the pressure level in the tank is typically reduced.

Further, DE 102 41 688 A1 discloses a hydrogen fueling station charging control unit to be capable of communicating through a communication network with a plurality of hydrogen vehicles running on hydrogen in on-vehicle hydrogen containers that are charged at a hydrogen fueling station, comprising a receiver that receives from each of the hydrogen vehicles through the communication network a hydrogen volume of each of the hydrogen containers, wherein based thereon, a hydrogen charging schedule is generated for the hydrogen fueling station for each of the hydrogen vehicles.

JP 2002 373230 A discloses a method and apparatus for supplying hydrogen using a computer and allowing a vehicle (hydrogen car) that consumes hydrogen while driving to reliably to safely obtain a supply of hydrogen.

Furthermore, in the article from International Journal of Hydrogen Energy, Elsevier Science Publishers B.V., Barking, UK, vol. 26, no. 7, Jul. 1, 2001, pages 777-782, XP004250297, ISSN: S0360-3199, DOI: 10.1016/S0360-3199 (00)00128-2 2 a refueling of a motor vehicle at a public filling station with liquid hydrogen is disclosed.

BRIEF SUMMARY

The object of the present invention is then to specify an improved method according to the preamble of claim 1, which enables the preparation for refueling to be optimized.

According to the invention, this object is achieved by a method having the features in claim 1, and here in particular in the characterizing part of claim 1. Advantageous embodiments and refinements of the method result from the dependent claims.

In the method according to the invention for preparing to refuel a tank in a vehicle with hydrogen, it is provided that the refueling takes place with liquid hydrogen. In preparation for refueling, as it is also known in the prior art, the tank pressure is lowered so that the highest possible quantity of hydrogen can be refueled during refueling, despite the unavoidable heating of the liquid hydrogen that flows into the vehicle's tank, before the maximum pressure of the tank is reached and leads to an abort of the refueling process and/or to the release of hydrogen which has changed to the gaseous phase.

According to the invention, the refueling takes place with liquid hydrogen, wherein the maximum pressure level of the tank, the expected pressure level of the tank when the filling station is reached, and the expected refueling quantity are transmitted to the filling station. On the one hand, the refueling can be reasonably prepared for on the vehicle side by lowering the pressure in the tank, and, on the other hand, the filling station has the expected data regarding the refueling, so that the refueling preparation can already be implemented there, so that it can be carried out as quickly and efficiently as possible.

According to a very advantageous refinement of the method according to the invention, it can be provided that specifications from the filling station are transmitted from the filling station to the vehicle's tank system. Such a comparison between the vehicle and the filling station is ideally suited to exchange the pressure levels and the quantities. In this way, the refueling process can generally be further optimized, so that the refueling time can be shortened and/or the amount of hydrogen refueled can be increased.

In particular, it is provided that the selection of the filling station takes place on the basis of a route pre-planned on a vehicle-external server, for example on a logistics management system, but takes place in a driving and refueling strategy module and is transmitted to the filling station and the vehicle-external server. This means that all participants in the system know about the defined refueling strategy and the expected arrival at the filling station, as well as the time, the required amount of hydrogen, and the maximum pressure level of the tank. According to an advantageous refinement of this idea, the selection can be made in a cloud via the driving and refueling strategy module, which preferably calculates different variants for refueling on the basis of a model-supported prediction of the tank state, which consists of pressure, temperature, and refueling quantity, and creates an optimized strategy with regard to the pressure drop in the tank and the selection of filling station. An optimized strategy for refueling can thus be determined via such a driving and refueling strategy module. To this end, different variants of strategies can be created and checked with the help of several calculations.

In this case, for example, an optimization can be carried out by means of iteration or other optimization methods or heuristics. This optimization then comprises, on the one hand, the selection of the filling station, and thus ultimately the distance and route thereto, and, on the other hand, a strategy for reducing the level of pressure in the tank in the most suitable and efficient way possible on this route and any intermediate stops along the route.

The pressure reduction can be achieved not only by using hydrogen for the drive energy, but also by using hydrogen to recharge a traction battery, for example, in order to implement climate control in the driver's cab and/or a cooling of cargo primarily via energy which is obtained from the hydrogen of a fuel cell. In addition, it is conceivable to provide compressed air or the like. For example, to cool cargo when the vehicle is stationary, electrical energy can also be generated from the hydrogen, which has to be consumed to lower the pressure. This electrical energy can then also be fed into a stationary energy supply grid via a charging cable and reimbursed by the grid operator. In the case of regeneratively generated hydrogen, the electricity generated in this way would have to be rated as regenerative and would accordingly receive higher reimbursement from the operator of the energy supply grid.

The driving and refueling strategy module not only takes into account the route and the particular details on the route to the filling station, but also, according to a very advantageous refinement of the idea, it can also take into account the future use of the vehicle on the pre-planned route after the refueling process. For example, if the route takes place over a steep incline, then it is possible to not recharge the traction battery, provided there are other options for using the hydrogen to reduce the pressure, since it would have been possible to charge the battery very efficiently and without external energy demand anyway through recuperation on such a route.

BRIEF DESCRIPTION OF THE DRAWINGS

Further advantageous designs of the method according to the invention also result from the exemplary embodiment, which is described in more detail hereinafter with reference to the FIGURE.

FIG. 1 is a block diagram of a system on which the method is based.

DETAILED DESCRIPTION

A possible detailed sequence of the method according to the invention is described below with reference to this block diagram, without restricting the method to this. A first step in this case is logistics planning in the box labeled 1 here, which is carried out by a fleet operator of a fleet of vehicles, in particular commercial vehicles. In general, this logistics planning 1 is carried out in a so-called transport management system. Transport orders are linked to individual vehicles 2 and their drivers in this case. Furthermore, time and route planning is carried out for the respective vehicle 2. The data packet created in this way in logistics planning 1 typically contains the route data, i.e. the coordinates of the individual sections, a schedule with departure times, loading and unloading times, break times, and the like. In addition, information about the vehicle 2, for example various vehicle parameters, its equipment, its vehicle identification number, and the like, is stored in the data packet. The data packet also contains data on the driver and the vehicle's cargo, and here in particular its weight.

This data packet is transmitted to a driving and refueling strategy module 3 via the communication labeled 1*a* and received there via a data interface 3.1. It is then further processed in a driving prediction module 3.3. Consistent with the information about the vehicle 2 from the data packet transmitted via communication 1*a*, data about the vehicle 2 is requested via communication 2*a*/2*b*, via a further interface module 3.2, or read out using a communication module 2.1 of the vehicle 2. This includes, for example, physical measured values of the liquid gas tank 2.3, for example pressure, temperature, and refueling quantity, which are recorded by a tank control module 2.4, as well as the state of charge of any traction batteries 2.8 or other energy storage devices that may be present. Using the logistics planning data 1*a* and the vehicle data 2*a*, the driving prediction module 3.3 of the driving and refueling strategy module 3 then calculates the energy requirement and other vehicle states on the planned route with the planned vehicle, its cargo, the measured values of its liquid gas tank 2.3, and the like. In this case, the traffic influences, such as possibly the driver, the topography, the weather, and the traffic infrastructure, are also taken into account accordingly. Via additional modules 4, this information can be requested as data packets via path 4*b* and/or retrieved via path 4*a*, for example, in the form of weather information 4.1 and/or traffic information 4.2. With the calculated results of the driving prediction module 3.3, a tank state prediction module 3.4 can calculate the consumption of the liquid hydrogen in the liquid gas tank 2.3 and, furthermore, also estimate the future state of the liquid gas tank 2.3 with regard to pressure, temperature, and fill level.

These results of the tank state prediction module 3.4 are then supplied to a refueling strategy module 3.5, which uses them to determine an optimal refueling strategy. In this case, the refueling strategy comprises the determination of the times or the appropriate filling stations 5 based on the planned route, the vehicle and time planning, as well as the precalculated energy consumption or the resulting range of the remaining energy available in the liquid gas tank 2.3 and possibly other energy storage devices 2.8. In addition, an availability or reservation of a time slot at a filling station 5 can be carried out by asking the filling station operator according to communication 5*a*/5*b*.

If an optimal refueling strategy has then been determined, if necessary by calculating and evaluating several strategies accordingly, then this is communicated accordingly to the fleet operator or dispatcher in logistics planning 1, to the vehicle 2, or to its driver, and to the operator of the selected filling station 5. In addition to displaying the determined refueling strategy, for example, in the vehicle 2 to inform the driver, in particular via a navigation device and an associated display, the refueling strategy, i.e. the time and route information, is forwarded to a central drive control unit 2.2 of the vehicle in advance of the planned refueling via the interface 2.1. The control unit specifies an operating strategy for the vehicle 2. Knowing the point in time at which the filling station 5 is reached for refueling and the calculated power requirement on the known route to get there, the operating strategy can then increase the consumption of liquid hydrogen in advance of the planned refueling in such a way that the pressure in the tank 2.3 drops as much as possible before the filling station 5 is reached. This can be done, for example, by a timely increase in fuel consumption by a fuel cell 2.6 in the vehicle 2, wherein the expected secondary consumers or their energy requirements and the energy requirements of the trip itself can be considered while taking into account the state of charge of an electric battery 2.8. Boxes 2.5 and 2.7 show the control units assigned to the fuel cell 2.6 and the battery 2.8.

In addition, it is the case that a pressure drop in the tank 2.3 can also take place via other consumers and in particular also when the vehicle is parked, or it can be initiated by the driver of the vehicle 2. The vehicle can be influenced either directly or via a remote control or an app or indirectly via logistics planning 1. Hydrogen can then be used, for example, to charge the battery 2.8 even while it is stationary, to precondition the cabin temperature of the vehicle 2, to cool the battery 2.8, or to cool the cargo in a refrigerated body. Other secondary consumers such as air compressors can also be controlled in order to fill compressed air tanks and thereby consume energy and lower the pressure in the tank 2.3. Of course, these aspects can also be implemented while the vehicle 2 is being driven.

A further alternative, and this is only possible when the vehicle 2 is stationary, is to connect it, via a corresponding charging plug, to a charging station, which in turn is connected to a power grid. This charging station, which enables a return of the charge from the vehicle 2 or its fuel cell 2.6 and/or battery 2.8 back to the power grid, can then be used to generate electricity from hydrogen with the fuel cell 2.6 and to supply it to the stationary power grid. This also allows the pressure in the tank 2.3 to be lowered, for example, immediately before a filling station 5 that is being approached as the trip continues, in order to optimize the refueling process. The electricity fed in can be reimbursed accordingly. If the fueled gas was generated regeneratively, this electricity can also be classified as regeneratively generated "green" electricity, fed in, and billed accordingly.

To determine the actual refueling strategy in the refueling strategy module 3.5, various optimization methods are then conceivable, since various options with filling stations at different distances corresponding to the consumption and states to be expected up to that point can be used according to the tank state prediction module 3.4 and/or the driving prediction module 3.3. The aim of the optimization must be to enable the most efficient strategy possible with the lowest possible energy and time losses and optimal costs. Therefore, prices for the fuel which have previously been obtained, for example, from the filling station operator and/or logistics planning 1 can also possibly be included in the strategy. In the case of feeding electrical energy into a grid as described above, the level of feed-in reimbursement that can be achieved can also be included in this strategy.

As already mentioned, the refueling strategy determined to be optimal is then communicated accordingly to the participants, i.e. the scheduler in logistics planning 1, the vehicle 2 or the driver, and the selected filling station operator. The information can be transmitted directly or indirectly, for example in that the vehicle itself only communicates with logistics planning 1 or the module 3 and all other steps are initiated from there.

The data, which are then transmitted from the vehicle 2 to the filling station 5 of the selected filling station operator, contain the feasible pressure level of the tank 3.2, i.e. the maximum pressure possible during refueling, and the expected tank quantity, which is communicated via the communication between the module 3 and the vehicle 2, as well as the transmission of the data to the filling station 5, so that preparation can already be made for the refueling process at the filling station 5. In addition, transmission in the opposite direction is also conceivable, for example in order to transmit specifications from the filling station 5 to the vehicle 2, which also contributes to optimizing the refueling.

The invention claimed is:

1. A method for preparing to refuel a tank in a vehicle with hydrogen, for which purpose the tank pressure is lowered in preparation for driving to a filling station, wherein the filling station is informed about the pending refueling, wherein the refueling takes place with liquid hydrogen, wherein the maximum achievable pressure level of the tank during refueling, the expected pressure level of the tank when the filling station is reached, and the expected refueling quantity are transmitted to the filling station, and wherein the pressure reduction takes place by consumption of hydrogen, for which purpose drive energy is made available primarily from the hydrogen and/or a traction battery is recharged and/or secondary consumers of the vehicle are operated.

2. The method according to claim 1, wherein specifications of the filling station are transmitted to the tank system of the vehicle from the filling station to the vehicle.

3. The method according to claim 1, wherein the selection of the filling station takes place on the basis of a route pre-planned on a vehicle-external server in a driving and refueling strategy module and is transmitted to the filling station and the vehicle-external server.

4. The method according to claim 3, wherein the driving and refueling strategy module is formed by a cloud.

5. The method according to claim 3, wherein the driving and refueling strategy module calculates different variants for refueling on the basis of a model-supported prediction of the tank state, which consists of pressure, temperature, and refueling quantity, and creates an optimized strategy with regard to the pressure in the tank and the selection of filling station.

6. The method according to claim 5, wherein in the case of the optimized strategy, future use of the vehicle on the pre-planned route after refueling is also taken into account.

7. The method according to claim 5, wherein further external data on states of the route from at least one additional external module is taken into account in the optimal strategy.

8. The method according to claim 5, wherein the optimized strategy is transmitted to the vehicle, the vehicle-external server, and the filling station.

9. The method according to claim 1, wherein the pressure reduction is carried out at least partially by the generation and grid feed-in of electrical energy when the vehicle is at a standstill.

10. The method according to claim 2, wherein the selection of the filling station takes place on the basis of a route pre-planned on a vehicle-external server in a driving and refueling strategy module and is transmitted to the filling station and the vehicle-external server.

11. The method according to claim 4, wherein the driving and refueling strategy module calculates different variants for refueling on the basis of a model-supported prediction of the tank state, which consists of pressure, temperature, and refueling quantity, and creates an optimized strategy with regard to the pressure in the tank and the selection of filling station.

12. The method according to claim 6, wherein further external data on states of the route from at least one additional external module is taken into account in the optimal strategy.

13. The method according to claim 6, wherein the optimized strategy is transmitted to the vehicle, the vehicle-external server, and the filling station.

14. The method according to claim 7, wherein the optimized strategy is transmitted to the vehicle, the vehicle-external server, and the filling station.

15. The method according to claim 2, wherein the pressure reduction takes place by consumption of hydrogen, for which purpose drive energy is made available primarily from the hydrogen and/or a traction battery is recharged and/or secondary consumers of the vehicle are operated.

16. The method according to claim 3, wherein the pressure reduction takes place by consumption of hydrogen, for which purpose drive energy is made available primarily from the hydrogen and/or a traction battery is recharged and/or secondary consumers of the vehicle are operated.

17. The method according to claim 4, wherein the pressure reduction takes place by consumption of hydrogen, for which purpose drive energy is made available primarily from the hydrogen and/or a traction battery is recharged and/or secondary consumers of the vehicle are operated.

18. The method according to claim 2, wherein the pressure reduction is carried out at least partially by the generation and grid feed-in of electrical energy when the vehicle is at a standstill.

19. The method according to claim 3, wherein the pressure reduction is carried out at least partially by the generation and grid feed-in of electrical energy when the vehicle is at a standstill.

* * * * *